(No Model.)

G. F. EISENHARDT.
STEP BEARING.

No. 352,308.  Patented Nov. 9, 1886.

Attest:
Jno. G. Hinkel Jr.
J. Campbell.

Inventor:
George F. Eisenhardt
By Foster and Freeman,
attys.

UNITED STATES PATENT OFFICE.

GEORGE F. EISENHARDT, OF PHILADELPHIA, PENNSYLVANIA, ASSIGNOR TO DIENELT & EISENHARDT, OF SAME PLACE.

STEP-BEARING.

SPECIFICATION forming part of Letters Patent No. 352,308, dated November 9, 1886.

Application filed August 20, 1886. Serial No. 212,213. (No model.)

*To all whom it may concern:*

Be it known that I, GEORGE F. EISENHARDT, a citizen of the United States, residing at Philadelphia, Philadelphia county, Pennsylvania, have invented certain new and useful Improvements in Step-Bearings, of which the following is a specification.

My invention relates to step-bearings, and has for its object to produce improved means for taking up the end pressure of rotating shafts, with a view to reducing the friction between the end of the shaft and the step-washer upon which it revolves, and to prevent the shaft and the bearing from remaining hot and from cutting or uniting themselves in one mass and sticking fast.

To these ends my invention consists in a step-bearing constructed substantially as hereinafter described, and illustrated in the accompanying drawings, forming part of this specification, and in which—

Figure 1:
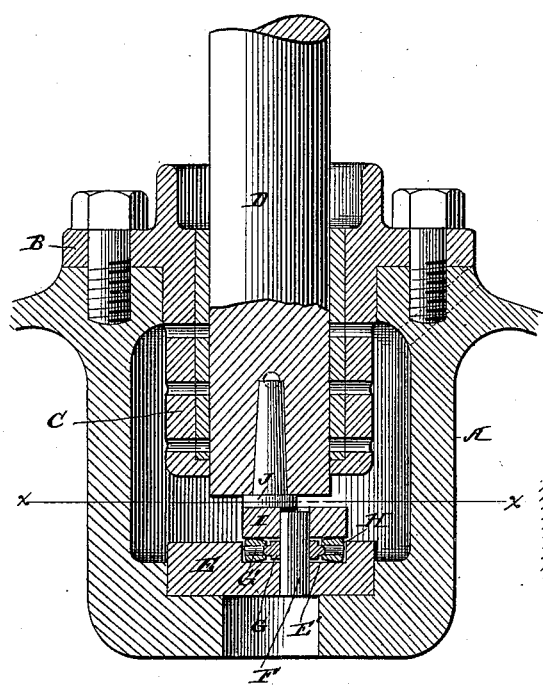
Figure 2:
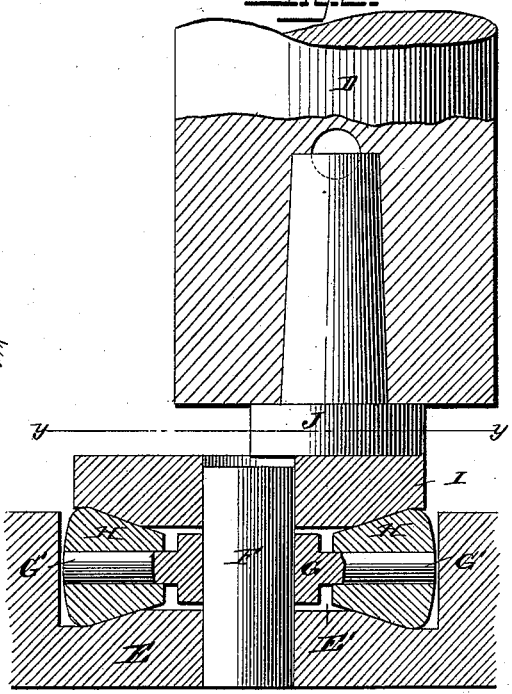
Figure 3:
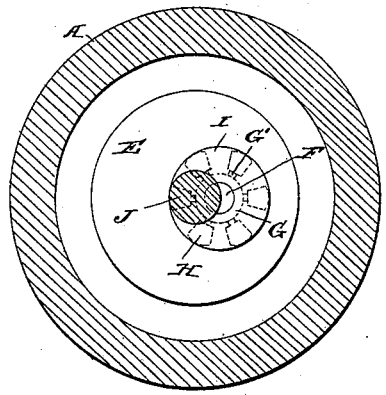
Figure 4:
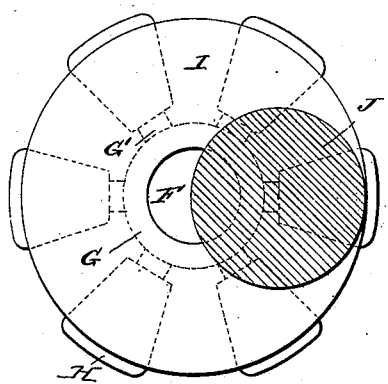

Figure 1 is a sectional view of a shaft-bearing and oil-chamber embodying my improvement. Fig. 2 is an enlarged sectional view of the shaft, step-washer, and friction-rolls. Fig. 3 is a transverse section of Fig. 1 on the line *x x*, and Fig. 4 is a similar view on line *y y*, Fig. 2.

Heretofore attempts have been made to provide step-bearings and to properly lubricate them; but it is often found that the wearing-surfaces get cut or ground so that they weld themselves together, so as to become practically useless for the purpose desired, and even when they do not so unite it has been difficult to properly lubricate the bearing-surfaces so that they will not become hot from rapid and continuous operation; and to overcome these difficulties is the object of the construction which I am about to describe.

The oil-chamber A is provided with a suitable cap-plate, B, which preferably extends some distance into the chamber and furnishes a substantial bearing, C, for the shaft D, and this bearing may be provided with any proper and well-known means for lubricating and for a wearing-surface, those indicated in the drawings being well adapted for the purpose, but forming no part of my present invention.

In the bottom of the chamber A is formed a depression in which fits the roll-casing E, and this casing is also provided with a depression or recess, E', in the center of which is fixed a pin or stud, F. Fitting loosely around this pin is a frame, G, having a number of radial arms or shafts, G', and upon each arm or shaft is fitted a friction-roll, H, rotating freely thereon, the frame, with the arms and rolls, revolving loosely around the center pin F.

Resting upon the top of the friction-rolls is a circular plate or washer, I, the central hole of which also loosely fits the center pin, F. If motion is imparted to this washer, it will rotate around the center pin, and with it will rotate the frame and friction rolls in a manner well understood.

In Fig. 2 I have shown the friction-rolls in the theoretically correct form to produce the least friction when the washer is rotated; but in practice I find that the rolls, in substantially the form shown in Fig. 1, are well adapted to the work required, and I do not therefore limit myself to the exact form of the friction-rolls.

The lower end of the shaft D is provided with a center pin, J, which rests upon the upper surface of the washer I; but the central line or axis of the shaft does not correspond with the central line of the pin, around which the friction-rolls, frame, and washer rotate; but, on the contrary, the shaft is eccentric thereto, being moved to one side, preferably about a distance equal to one-fourth the diameter of the step-washer I, or about one-half the diameter of the bearing-surface of the center pin J, the relative diameters of these two being preferably about two to one.

If the central line of the shaft and pin, around which the washers and rolls rotate, coincided, it is apparent that the shaft and washer would rotate together at about the same speed; but when the central lines do not so correspond, but are eccentric, as shown, the rotation of the shaft produces friction between its center pin and the washer upon which it rotates, and this friction being greatest on the surface of the washer which is farthest from its center, the washer is caused to rotate in the same direction as the shaft, but at a greatly reduced speed. The speed of rotation varies of course according to the relations of the parts. In the arrangement shown I have found that the proportions are about one rotation of the washer to ten of the shaft. The advantages of this eccentric arrangement will be apparent to those skilled in the art, and consist chiefly in reducing the great wear which the rolls and the surfaces in contact with them would undergo were they to rotate at high speed under heavy pressure in the constantly-changing position of the step-washer, preventing the grinding and welding of the parts together, and in insuring a constant and even lubrication of the surface in contact with the rapidly-rotating center pin of the shaft and preventing friction.

It is preferable to make the operating parts of hardened steel to prevent wear; and while I have shown the parts as arranged in certain proportions and relations to each other, it should be distinctly understood that I do not limit my invention thereto, as it is independent of any of those details.

What I claim is—

1. The combination, with the rotation shaft having an endwise pressure, of a rotating washer supporting the shaft and arranged eccentric thereto, substantially as described.

2. The combination, with the shaft and center pin, of the washer mounted upon a pin arranged eccentric to the shaft, substantially as described.

3. The combination, with the shaft and center pin, of the washer and friction-rolls rotating on a pin eccentric to the shaft, substantially as described.

4. The combination, with the oil-chamber and shaft, of the roll-casing, rolls, roll-frame, and washer, substantially as described.

5. The combination, with the recessed roll-casing having a pin in the recess, of the roll-frame and washer rotating on said pin, and a shaft bearing on said washer, substantially as described.

6. The combination, with the shaft and its center pin, of a washer eccentric to said pin, the diameter of the washer being about twice that of the pin, substantially as described.

7. The combination, with the oil-chamber, of a rotating washer having a comparatively broad surface, and a shaft bearing eccentrically upon the washer, whereby rotating surfaces are uniformly lubricated, substantially as described.

In testimony whereof I have signed my name to this specification in the presence of two subscribing witnesses.

GEORGE F. EISENHARDT.

Witnesses:
WM. H. DOERING,
WM. F. SIEGENER.